US009274971B2

(12) United States Patent
Fleischer et al.

(10) Patent No.: US 9,274,971 B2
(45) Date of Patent: Mar. 1, 2016

(54) LOW LATENCY DATA EXCHANGE (71) Applicant: International Business Machines Corporation, Armonk, NY (US)

(72) Inventors: Bruce M. Fleischer, Bedford Hills, NY (US); Thomas W. Fox, Hopewell Junction, NY (US); Hans m. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 13/685,816

(22) Filed: Nov. 27, 2012

(65) Prior Publication Data
US 2014/0149680 A1 May 29, 2014

(51) Int. Cl.
*G06F 12/08* (2006.01)

(52) U.S. Cl.
CPC .................................. *G06F 12/0888* (2013.01)

(58) Field of Classification Search
CPC ............ G06F 12/0088; G06F 12/0897; G06F 12/0888
USPC ......................................................... 711/138
See application file for complete search history.

(56) References Cited

U.S. PATENT DOCUMENTS

| | | | | |
|---|---|---|---|---|
| 3,820,078 A * | 6/1974 | Curley et al. | ................. | 711/118 |
| 4,011,547 A * | 3/1977 | Kimmel | ......................... | 712/208 |
| 4,464,712 A | 8/1984 | Fletcher | | |
| 4,835,738 A * | 5/1989 | Niehaus et al. | ................ | 711/154 |
| 4,851,993 A | 7/1989 | Chen et al. | | |
| 5,675,807 A * | 10/1997 | Iswandhi et al. | .............. | 710/260 |
| 5,790,776 A * | 8/1998 | Sonnier et al. | ................... | 714/10 |
| 5,838,894 A * | 11/1998 | Horst | .............................. | 714/11 |
| 5,991,855 A * | 11/1999 | Jeddeloh et al. | .............. | 711/146 |
| 6,018,798 A * | 1/2000 | Witt et al. | ...................... | 712/220 |
| 6,021,468 A * | 2/2000 | Arimilli et al. | ................ | 711/122 |
| 6,112,018 A * | 8/2000 | Tran et al. | ...................... | 712/202 |
| 6,247,094 B1 * | 6/2001 | Kumar et al. | ...................... | 711/3 |
| 6,321,233 B1 * | 11/2001 | Larson | | |
| 6,449,701 B1 * | 9/2002 | Cho | .............................. | 711/154 |
| 6,678,803 B2 * | 1/2004 | LaBerge | ......................... | 711/154 |
| 6,779,085 B2 * | 8/2004 | Chauvel | ......................... | 711/135 |
| 6,973,558 B2 * | 12/2005 | Hudson | ......................... | 711/202 |
| 7,002,982 B1 * | 2/2006 | Herbst | ......................... | 370/428 |
| 7,340,742 B2 * | 3/2008 | Tabuchi | ........................ | 718/103 |
| 7,725,659 B2 * | 5/2010 | Gschwind et al. | ............ | 711/138 |

(Continued)

OTHER PUBLICATIONS

Rajaraman, V. Buffer Stack Memory Organization. Jul. 10, 1975. IET, vol. 11, Issue 14, P305.*

(Continued)

*Primary Examiner* — Jared Rutz
*Assistant Examiner* — Khoa D Doan
(74) *Attorney, Agent, or Firm* — Cantor Colburn LLP (57) ABSTRACT

According to one embodiment, a method for exchanging data in a system that includes a main processor in communication with an active memory device is provided. The method includes a processing element in the active memory device receiving an instruction from the main processor and receiving a store request from a thread running on the main processor, the store request specifying a memory address associated with the processing element. The method also includes storing a value provided in the store request in a queue in the processing element and the processing element performing the instruction using the value from the queue.

17 Claims, 7 Drawing Sheets

(56) References Cited

U.S. PATENT DOCUMENTS

| | | | |
|---|---|---|---|
| 7,882,307 B1* | 2/2011 | Wentzlaff et al. | 711/119 |
| 8,738,860 B1* | 5/2014 | Griffin et al. | 711/122 |
| 2002/0078124 A1* | 6/2002 | Baylor et al. | 709/106 |
| 2003/0037117 A1 | 2/2003 | Tabuchi | |
| 2003/0140196 A1* | 7/2003 | Wolrich et al. | 711/118 |
| 2004/0068615 A1* | 4/2004 | Chaudhari et al. | 711/137 |
| 2005/0144382 A1* | 6/2005 | Schmisseur | 711/114 |
| 2006/0143509 A1 | 6/2006 | Okawa | |
| 2007/0094651 A1* | 4/2007 | Stephens et al. | 717/151 |
| 2008/0104329 A1* | 5/2008 | Gaither et al. | 711/138 |
| 2008/0244192 A1* | 10/2008 | Uchiyama | 711/144 |
| 2011/0154002 A1 | 6/2011 | Liu et al. | |
| 2012/0117323 A1* | 5/2012 | Cypher et al. | 711/118 |
| 2013/0170334 A1* | 7/2013 | Koinuma et al. | 370/216 |
| 2013/0212335 A1* | 8/2013 | Teranishi et al. | 711/138 |
| 2013/0246712 A1* | 9/2013 | Liu et al. | 711/138 |
| 2013/0290647 A1* | 10/2013 | Maeda et al. | 711/149 |
| 2013/0318294 A1* | 11/2013 | Walker | 711/109 |
| 2013/0346689 A1* | 12/2013 | Araki et al. | 711/113 |
| 2014/0068164 A1* | 3/2014 | Wang et al. | 711/104 |
| 2014/0122838 A1* | 5/2014 | Llamas et al. | 712/220 |
| 2014/0143493 A1* | 5/2014 | Loh et al. | 711/122 |
| 2014/0143503 A1* | 5/2014 | Gaither et al. | 711/138 |
| 2014/0143513 A1* | 5/2014 | Reid et al. | 711/162 |

OTHER PUBLICATIONS

Barrera, D. Central Queueing Element for Single Chip RISC Microprocessor. IBM TDB. Apr. 1994. vol. 37. No. 04B.*

Duke University, Dept of Computer Science. http://www.cs.duke.edu/csl/docs/jg/user/UserGuide/html. Aug. 2007.*

U.S. Appl. No. 13/787,057; Non-final Office Action; Date Filed: Mar. 6, 2013; Date Mailed: Aug. 28, 2014; 19 pages.

U.S. Appl. No. 13/787,057; Final Office Action; Date Filed: Mar. 6, 2013; Date Mailed: Jan. 7, 2015; 30 pages.

* cited by examiner

LOW LATENCY DATA EXCHANGE

BACKGROUND

The present invention relates generally to computer systems, and more particularly to low latency data exchange for a computer system with remote processing.

In computer systems with distributed execution of tasks transfer of data between a remote processing unit and a main processor can affect system performance and latency. In systems including several levels of cache, a communication of data includes copying the data to each cache level as the data is transferred to or from a remote location. Copying of data to each cache level can increase latency and power consumption in the computer system.

SUMMARY

According to one embodiment, a method for exchanging data in a system that includes a main processor in communication with an active memory device is provided. The method includes a processing element in the active memory device receiving an instruction from the main processor and receiving a store request from a thread running on the main processor, the store request specifying a memory address associated with the processing element. The method also includes storing a value provided in the store request in a queue in the processing element and the processing element performing the instruction using the value from the queue.

According to another embodiment, a method for exchanging data in a system that includes a main processor in communication with an active memory device is provided. The method includes a processing element in the active memory device receiving an instruction from the main processor, receiving a load request from a thread running on the main processor, the load request specifying a memory address associated with the processing element and placing tag information relating to the load request in a queue in the processing element. The method also includes the processing element performing the instruction, placing a result of the instruction in the queue and communicating the result to the main processor in response to the load request, wherein communicating the result comprises bypassing all system cache before it is received by the main processor

DETAILED DESCRIPTION

An embodiment is directed to a computer system with a main processor and one or more active memory devices. In particular, a compiler provides an executable module for execution on the main processor and active memory devices, where the executable module includes a first portion of code to be executed on the active memory device and a second portion of code to be executed on the main processor. In an embodiment, the compiler optimizes and organizes data exchanges in the computer system to improve efficiency during execution of the executable. The executable can coordinate data exchanges between a processing element in the active memory device and the main processor to ensure that data is provided and available for execution of the code on the main processor and/or processing element.

In one embodiment, there are data dependencies between portions of code being executed by a processing element in a system and portions of code being executed by the main processor in the system. In embodiments, an efficient and low-latency method and system for communication and exchange of small pieces of data between the processing elements and main processor provides reduced power consumption. For example, an exchange of relatively small data values, such as 8 byte or 16 byte values, is provided to reduce latency and improved efficiency in executing executable code. In embodiments, data is transferred directly between a register in a main processor core to a queue in a processing element, where the communication path for the direct transfer does not include cache levels, thus reducing latency and saving power. The communication path may include an interconnect network with one or more crossbar switches routing the data between the processor core register and a queue in a processing element. The method and system may be used to provide a value for a thread or to store a value from a thread, where the thread runs on the main processor. The communication of data may be between code running on the processing element and the thread on the main processor, where a queue in the processing element holds the value until code running on the processing element requires the value.

In another embodiment, code running on the processing element produces a result value that is placed in a queue in the processing element. The main processor may then send a load request to read the result value from the queue, where the result may be used by code executing on a thread in the main processor. These data exchanges are directly between a register in the main processor core and a queue in the processing element, thus bypassing all system cache. In an embodiment, the communication path between the register and queue is a crossbar switch in the main processor linked to a crossbar switch in the active memory device.

In an embodiment, the main processor reads or loads data produced by a processing element using a pull protocol for the load request, where the data is pulled from a queue in the processing element. In addition, memory load requests from the main processor to the processing element specify a memory address associated with the processing element that the data will be sourced from. In one embodiment, an interconnect network in the active memory device includes the crossbar switch, where the interconnect network detects the specified address and routes the load request to the processing element instead of a memory controller in the device. Further, a plurality of load requests may be queued up in the processing element until the data for each request has been computed by code running on the processing element. After the data for each request is computed, the data is sent back to the processor as a data payload response to the corresponding load request. To simplify the synchronization of the data exchange, the association between requested and result data is provided by the ordering of received requests and, thus, is dependent on a predetermined program execution on the processing element and main processor. The ordering and predetermined program execution is provided by the compiler in the executable module. The data exchange is synchronized in that the requester (e.g., main processor or processing element) gets the data it expects in response to an appropriate request, where multiple requests are provided the correct corresponding data in the proper order. Synchronization is also provided by producing code that is performed on each of the processing element and main processor from source code from an executable module based on an application. Thus, a compiler coordinates the code distribution and data execution during compiling of the application into an executable module.

An embodiment is directed to a computer system including a memory device, such as an active memory device or active buffered memory device. The memory device may be any suitable memory device including one or more memory device (e.g., random access memory "RAM" chips) connected to a hub chip (also referred to as a memory controller chip) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of memory stacks are located on a memory module, where each stack has a respective hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

Figure 1:
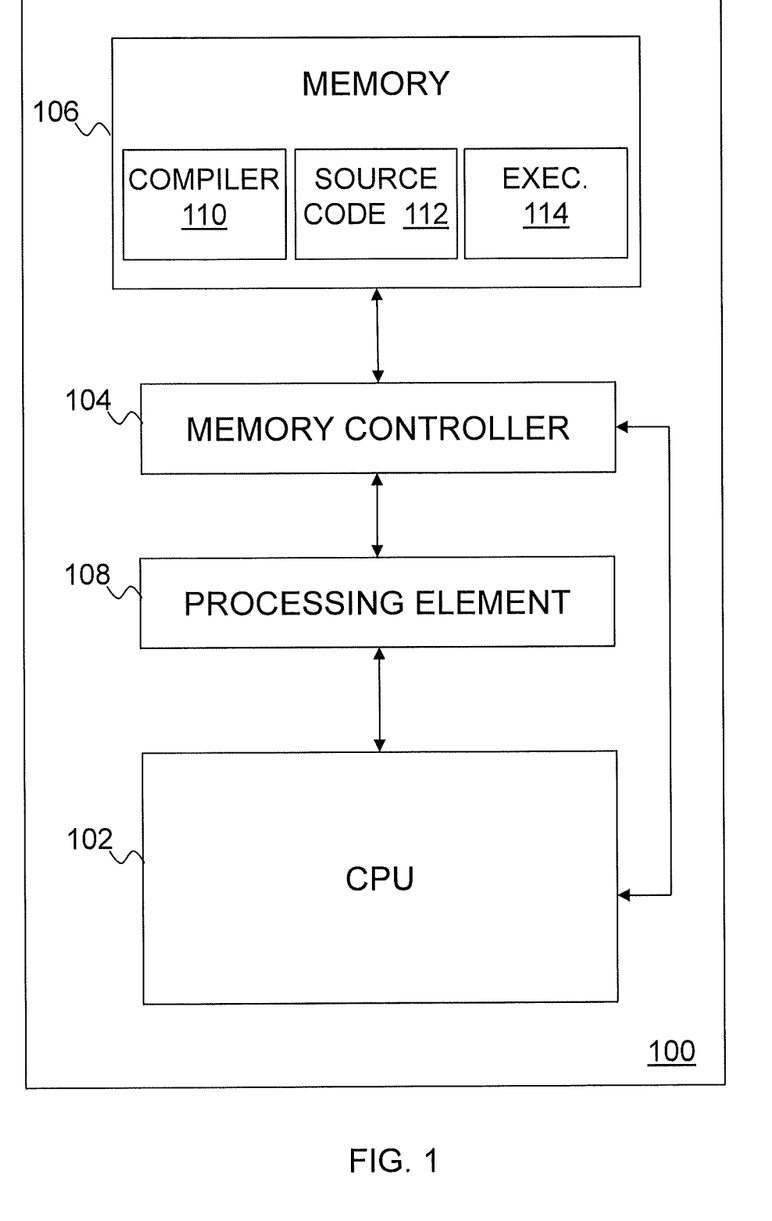
FIG. 1 illustrates a block diagram of a system for an active memory device in accordance with an embodiment.

FIG. 1 illustrates a block diagram of a system with a memory device accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted, such as a memory system with no processing element 108. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

The memory 106 may store one or more separate programs, each of which comprises an ordered listing of executable instructions for implementing logical functions. For example, software stored in the memory 106 may include an operating system (not shown), source code 112, and one or more applications. As shown in FIG. 1, the memory 106 stores source code 112 and a compiler 110. The compiler 110 may alternatively be stored and executed on a system that is external to the system 100 for which it produces executable programs, such as executable 114. The compiler 110 includes numerous functional components for implementing the features, processes, methods, functions, and operations of the exemplary embodiments, as will be described further herein. Optimized code is executed in a runtime environment (not shown) of the system 100.

The applications may include a source code 112, executable program (object code), script, or any other entity comprising a set of instructions to be performed. When the application is source code 112, the program code is translated via the compiler 110 to the executable 114.

Figure 2:
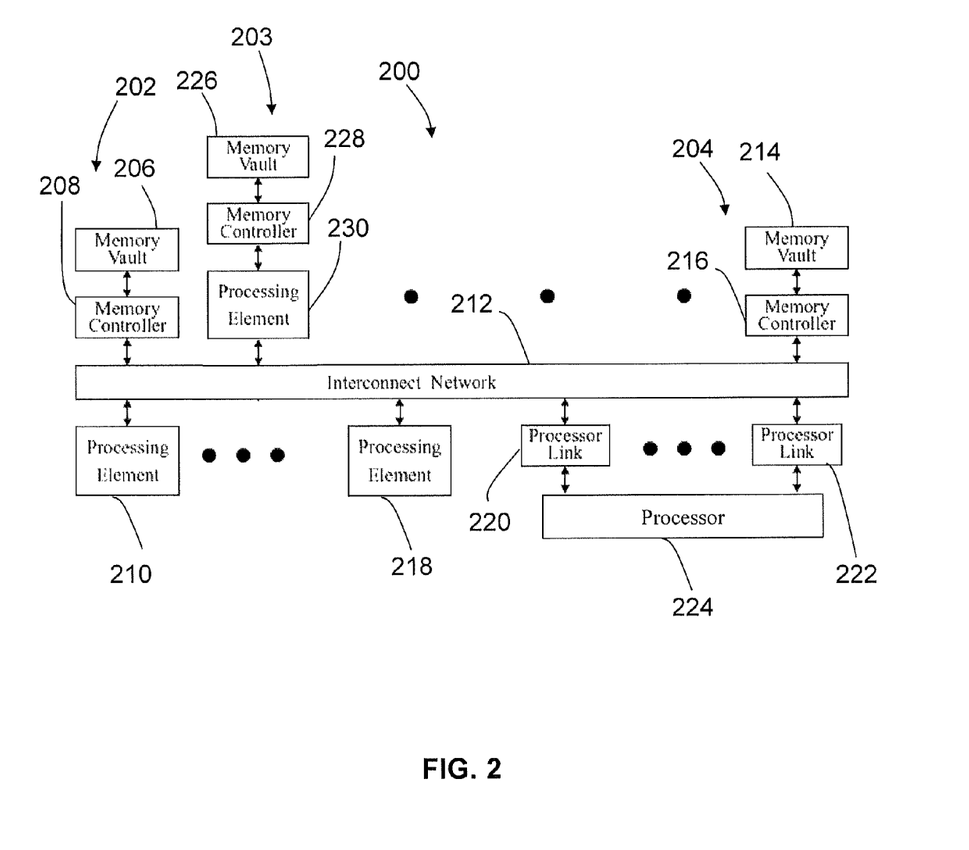
FIG. 2 illustrates a block diagram of a system with an active memory device in accordance with an embodiment.

FIG. 2 is a schematic diagram of an embodiment of a computer system 200 implementing dynamic memory page management. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing elements 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing elements, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

Figure 3:
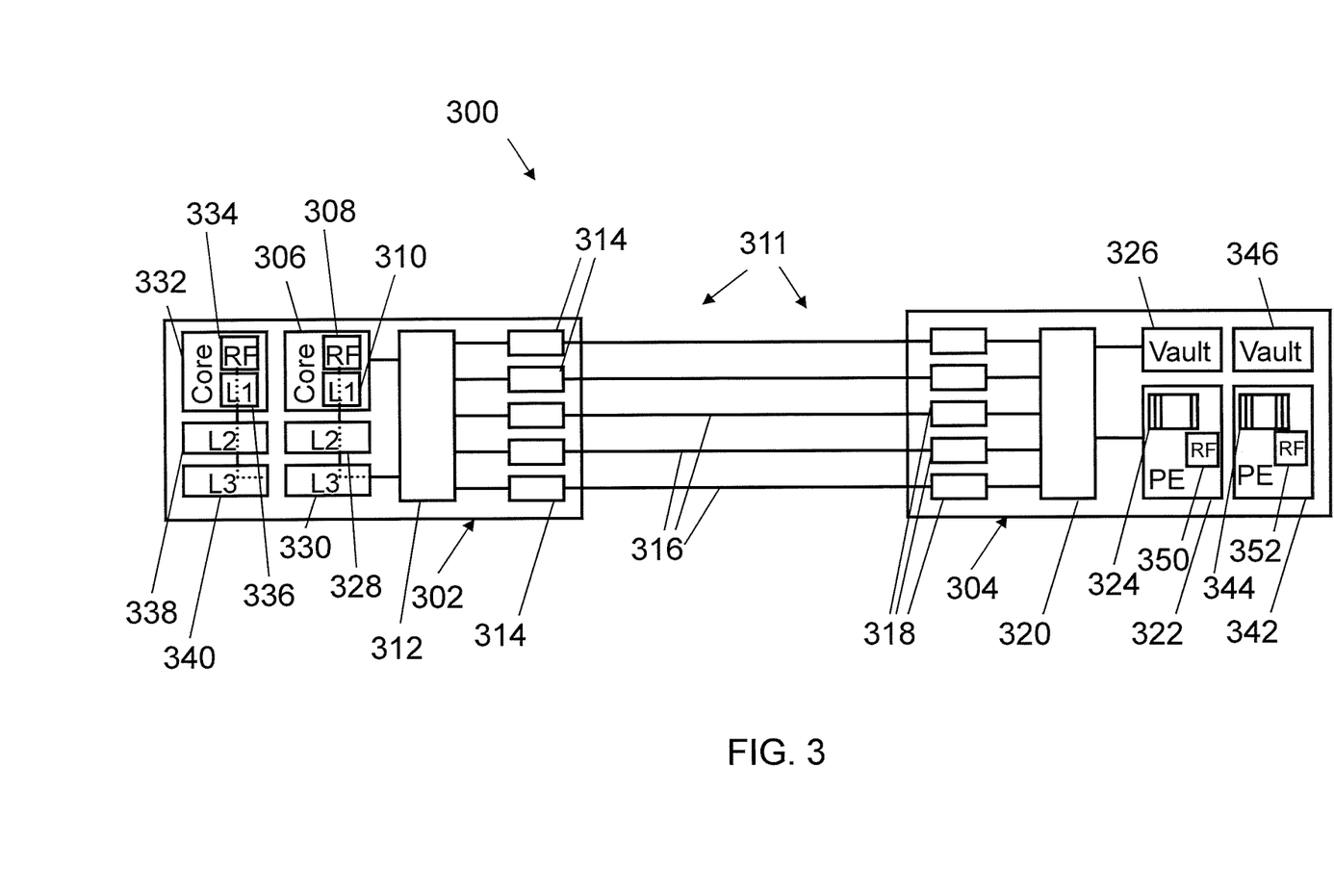
FIG. 3 is a block diagrams a computer system including a main processor and an active memory device according to an embodiments.

FIG. 3 is a block diagram of a computer system 300 having low latency data exchange according to an embodiment. The computer system 300 includes a main processor 302 and an active memory device 304. In embodiments, the active memory device 304 is similar to the devices discussed above with reference to FIGS. 1 and 2, where the active memory device 304 includes processing elements 322 and 324 as well as memory vaults 326 and 346. The main processor 302 includes cores 306 and 332. The core 306 includes a register file 308 and a first cache level 310. The core 332 includes a register file 334 and a first cache level 336. Data may be directly transferred to and from the register files 308 and 334 to processing elements 322 and 342 via an interconnect network 311. The interconnect network 311 includes a crossbar switch 312, links 314, links 316, links 318 and crossbar switch 320. In an embodiment, the links 314, 316 and 318 may include suitable signal mediums, such as conductive or optical wiring.

Embodiments provide data transfer between register files 308, 334 as well as register files 350, 352 and queues 324, 344 located in the processing elements 322, 324. This direct data exchange or transfer reduces latency and power usage by using non-cacheable memory loads and stores. For example, the data exchanges with register file 308 do not travel through cache level 310, cache level 328 or cache level 330, thus reducing latency and power that can be increased by copying the data to cache levels. Processor core 332 similarly includes cache levels 336, 338 and 340, where these cache levels are also bypassed using the low latency data exchange.

In one embodiment, the memory loads use a pull protocol to load data from the queues 324, 344 while the memory stores use a push protocol to write data to the queues. In embodiments, the queues 324, 344 operate as intermediate storage points in the transfer processes. In a memory load embodiment, data may be initially loaded from register files 350, 352 into queues 324, 344, where the data is then transferred to the register file(s) 308, 334. In a memory store embodiment, data may be received from the register file(s) 308, 334 and stored to register files 350, 352 via queues 324, 344. In embodiments, the compiler provides in order operation of instructions in the executable code distributed between the main processor 302 and processing elements 322, 342. In addition, the data exchange between the register files 308, 334 and the register files 350, 352 via queues 324, 344 provides synchronization based on a predetermined code execution established during the compiling process. Thus, in an "in order" code execution, the data is provided in a predetermined order in the queues to reduce overhead and simplify the process. Accordingly, the order is arranged by the compiler when making the executable module, where portions of the executable code are executed on the processing element and portions are executed on the main processor. In an embodiment, where the code executes instructions in an "out of order" fashion, tags are provided along with the data in the queue to identify the purpose and/or location of the data. The request may use the tag to identify a piece of code in the processing element or processor location that will use the data. Accordingly, such schemes use the tags to identify data to allow out-of-order data exchange between register files and queues.

In an embodiment, the processing elements 322, 342 load data from the processor 302 using a push protocol in the load request. When the processor 302 has computed a value that is required by one of the processing elements 322, 342, the processor 302 performs a store request to an address associated with one of the processing elements 322, 342, where the request includes the address. The data is then entered into the corresponding queue in the processing element and is later read from the queue when the data is needed by the code running on the processing element. The code running on the processing element is a portion of the executable code provided by the compiler, where the compiler also designates the code to be executed by the processing element. Thus, the data is ready for the code in the proper order, where in order execution of the code allows the processing element to pull the value in the data from the queue at the proper time. In an embodiment, association between provided and requested data and their arrangement in the queues 324, 344 is done by the ordering of the data transfers and, therefore, is dependent on a predetermined program execution on the processing element and main processor.

Figure 4:
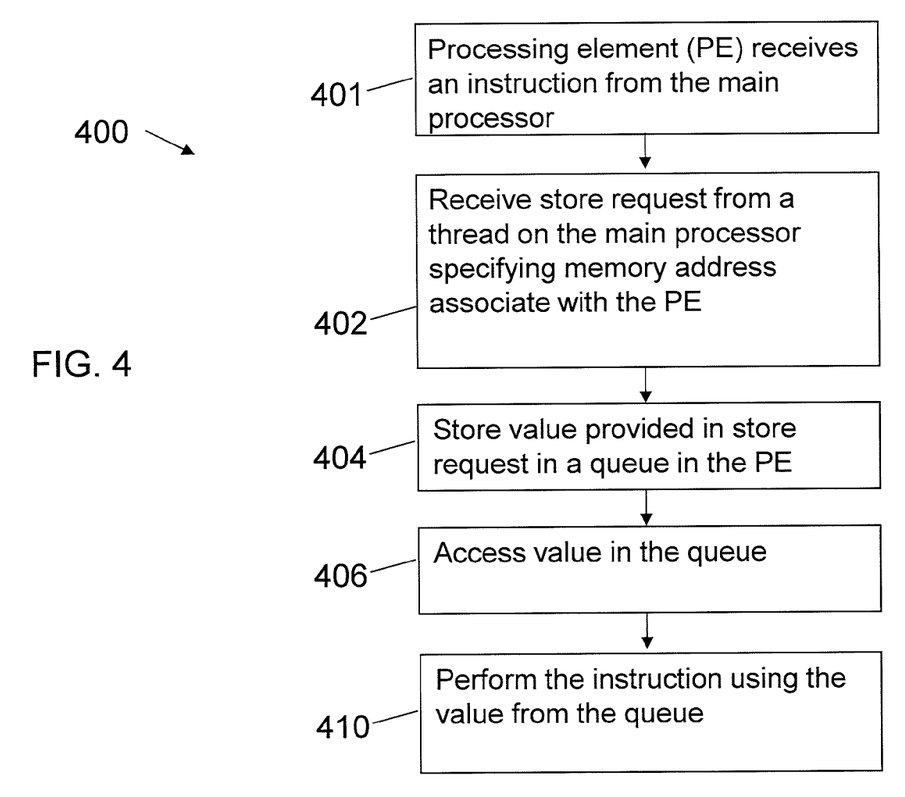
FIGS. 4 and 5 are flow charts illustrating low latency data exchange between a main processor and active memory device according to various embodiments.

FIG. 4 is a flow chart 400 of an exemplary process for exchanging data in a computer system, such as the systems in FIGS. 1-3. In an embodiment, the blocks in the flow chart 400 are performed by hardware in the computer system (e.g., main processor, processing element) running code generated by a compiler, where the code is performed on a processing element and main processor. In block 401, a processing element receives an instruction from a main processor. In an embodiment where the instruction is a library instruction executed by the processing element, the instructions are received and stored at a program initialization time of the processing element where the instructions of the program to be executed on the processing element are read from memory and stored in the library. In block 402, the processing element receives a store request from code running on a thread in the main processor, where the store request specifies a memory address associated with the processing element. In an embodiment, the store request from the main processor bypasses all system cache (e.g., level 1 cache, level 2 cache, etc.) before it is received by the processing element. In embodiments, the received store request is a push request to push a value to a queue. In block 404, a value provided in the store request is stored in a queue in the processing element. In block 406, the value in the queue is accessed by the processing element. In an embodiment, the instruction is in a portion of executable code that is communicated by the main processor to the processing element for execution, where data communication is synchronized based on predetermined code execution provided during compiling of the code. The compiler compiles an application into an executable module that includes code to be executed on the processing element and the main processor as described above, where the order of execution of code on the processing element and main processor is synchronized by the compiler to provide for the data exchange described herein. In block 410, the processing element performs the instruction using the value from the queue.

In embodiments, the queue in the processing element is a shared queue that is used for both store requests and load requests. In one embodiment, the queue is a first-in-first-out (FIFO) queue. In an embodiment, the value stored in the queue is stored in a queue entry identified by a processor head pointer, wherein the processor head pointer moves to a subsequent entry after storing the value in the queue entry. In an embodiment, the queue entries are accessed and pulled from the queue in order by the processing element, where the entries are in the correct order due to synchronization provided by the compiler when compiling the code.

Figure 5:
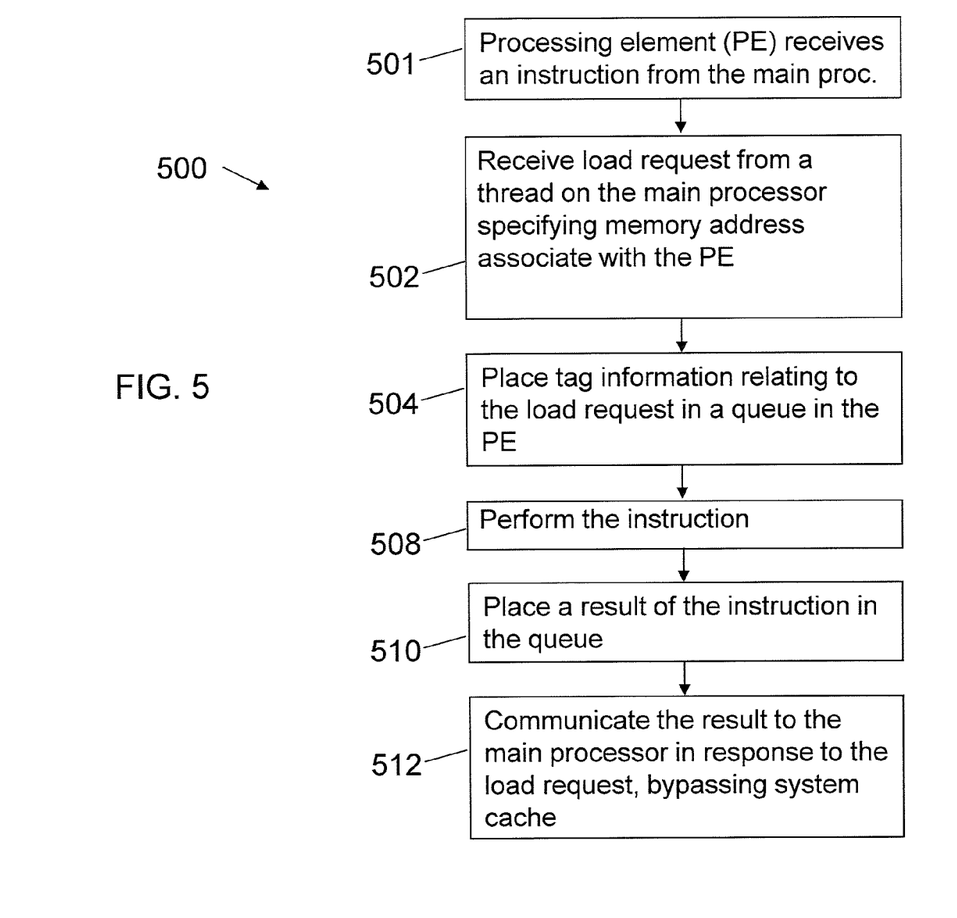

FIG. 5 is a flow chart 500 of an exemplary process for exchanging data in a computer system, such as the systems in FIGS. 1-3. In an embodiment, the blocks in the flow chart 500 are performed by hardware in the computer system (e.g., main processor, processing element) running code generated by a compiler, where the code is performed on a processing element and main processor. In block 501, a processing element receives an instruction from a main processor. In an embodiment where the instruction is a library instruction executed by the processing element, the instructions are received and stored at a program initialization time of the processing element where the instructions of the program to be executed on the processing element are read from memory and stored in the library. In block 502, the processing element receives a load request from code running on a thread in the main processor, where the load request specifies a memory address associated with the processing element that will provide a requested value, such as a result. In an embodiment, the data received by the main processor in response to the load request bypasses all system cache (e.g., level 1 cache, level 2 cache, etc.) before it is received from the processing element. In embodiments, the received load request is a pull request to pull a value from a queue.

In block 504, tag information provided in the load request is placed in a queue in the processing element. In an embodiment, the tag information relates to the data requested by the load request and describes the thread running on the main processor that will use the requested data, where such information is provided in a process ID or thread ID in the request. In an embodiment, the instruction is in a portion of executable code that is transferred by the main processor to the processing element for execution, where data communication is synchronized based on predetermined code execution provided during compiling of the code. The compiler provides synchronization and coordination of data exchanges as it compiles an application that includes code to be executed on the processing element and the main processor. In block 508, the processing element performs the instruction. In block 510, the processing element places a result of the instruction in the queue. In an embodiment, the result of the instruction is placed in a register file in the processing element and then copied from the register file to the queue in the processing element. The result value is placed in a data entry in the queue corresponding to the tag information entry from block 504, where the data is then communicated (e.g., via a pull operation) from the queue to a selected location identified by the tag information (e.g., a processor register file). In block 512, the result is communicated from the processing element to the main processor, where the result is transmitted from the queue to a register file in a core in the main processor while bypassing all system cache.

In embodiments, the queue in the processing element is a shared queue that is used for both store requests and load requests. In an embodiment, the value stored in the queue is stored in a queue entry identified by a processor head pointer, wherein the processor head pointer moves to a subsequent entry after storing the value in the queue entry. In an embodiment, the result value is an 8 byte value or a 16 byte value.

In an embodiment, the order of tag information in the queue is synchronized and ordered based on a predetermined code execution on both the processing element and the main processor, where the predetermined code execution is determine by the compiler when compiling the code. In an example, the predetermined code execution is an in order execution where the result is placed in a data entry in the queue without an identifier, where a tag information entry of the queue corresponds to the data entry, thus enabling the result to be communicated to the correct thread and/or register file in the main processor. In one embodiment, the queue is a first-in-first-out (FIFO) queue.

In embodiments, the tag information relating to the load request is placed in an information entry in an information portion of the queue, wherein the information entry has a corresponding data entry in a data portion of the queue, where the result is placed in the corresponding data entry. In cases where the tag information in the information entry does not have a value in the corresponding data entry, the system "waits" for the data entry to be pushed to the queue. The result value is then pulled from the queue as a normal pull request, where the result is transferred across the interconnect network, bypassing system cache, and written to a main processor register file. In addition, the result is placed in the data entry identified by a processing element head pointer, wherein the processing element head pointer moves to a subsequent entry after placing the value in the data entry.

Figure 6:
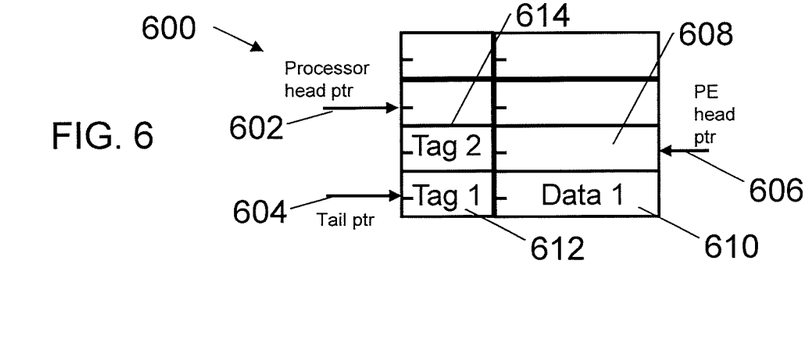
FIGS. 6, 7 and 8 are diagrams of a queue used for data exchange with a load request according to an embodiment.
Figure 7:
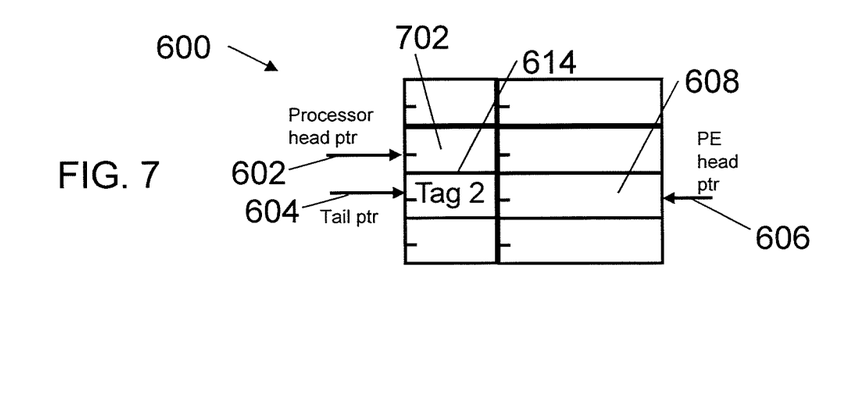
Figure 8:
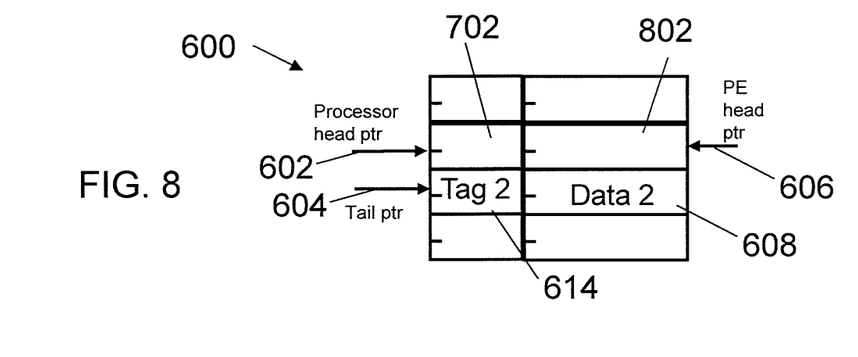

FIGS. 6, 7 and 8 are diagrams of a queue used for data exchange with a load request according to an embodiment. Initially, the queue may be empty until a load request arrives from a main processor. As shown in FIG. 6, a queue 600 includes a first load request tag 612 and a second load request tag 614 in a tag column of the queue. Accordingly, a processor head pointer 602 points to a next element in the queue for the subsequent request. A tail pointer 604 indicates a tag that is waiting on a data request to be filled. Accordingly, a first data in an element 610 is produced by the processing element and placed in a data column of the queue, where the first data in element 610 corresponds to the first data request 612. A processing element (PE) head pointer 606 points to an element 608 that is to be subsequently filled by the PE. In FIG. 7, the data in element 610 is sent to the main processor in response to the processor request for the first data. Accordingly, the first load request tag 612 is removed from the queue and the tail pointer 604 advances to the second load request tag 614. The processor head pointer 602 points to element 702, which will receive a tag for subsequent requests. In FIG. 8, the PE produces and places a second data in element 608, thus advancing the PE head pointer to element 802 for a subsequent data request. Then, the PE will then send the second data in element 608 is sent to the main processor in response to the processor request for the second data.

In embodiments of a store queue are similar to the queue shown in FIGS. 6-8, but may not include the tag information entries. Further, embodiments may only use a processor head pointer for pointing to the next entry to receive the written processor produced data. The PE reads from a tail pointer when it needs the data produced by the processor. If the processor has not yet produced the data, the PE stall until it produces the data.

Technical effects and benefits include a system and method that provides reduced latency and power consumption by providing communication paths from a queue in a processing element to a register file in a main processor. The data transferred via the communication path is relatively small (e.g., 8 or 16 bytes) and bypasses system cache.

Embodiments include a method and system for exchanging data, the system comprising a main processor in communication with an active memory device, the method comprising receiving, at a processing element in the active memory device, an instruction from the main processor; receiving, at the processing element, a load request from a thread running on the main processor, the load request specifying a memory address associated with the processing element; placing tag information relating to the load request in a queue in the processing element; performing, by the processing element, the instruction; placing a result of the instruction in the queue; and communicating, by the processing element, the result to the main processor in response to the load request, wherein communicating the result comprises bypassing all system cache before it is received by the main processor.

In an embodiment, placing the result of the instruction in the queue comprises placing the result in a shared queue that is used for both store and load requests.

In an embodiment, placing the result of the instruction in the queue comprises placing an 8 byte result value or a 16 byte result value in the queue.

In an embodiment, placing tag information relating to the load request in the queue, performing the instruction, and placing a result of the instruction in the queue are synchronized based on a predetermined code execution on both the processing element and the main processor. In an embodiment, wherein the predetermined code execution is determined by a compiler when compiling an application that has code execute on both the processing element and the main processor. In an embodiment, the predetermined code execution comprises an in order execution wherein the result is placed in the queue without an identifier.

In an embodiment, receiving the load request from the thread running on the main processor further comprises receiving a load request that specifies the memory address associated with the processing element that will provide the result.

In an embodiment, receiving the load request from the thread running on the main processor further comprises receiving a load request from the main processor that bypasses all system cache before it is received by the processing element.

In an embodiment, placing the result of the instruction in the queue further comprises placing the result in a register file in the processing element and copying the result from the register file to the queue in the processing element.

In an embodiment, receiving the load request further comprises receiving a pull request to pull the result from the queue.

In an embodiment, placing tag information relating to the load request in the queue further comprises placing the tag information in an information entry in an information portion of the queue, wherein the information entry has a corresponding data entry in a data portion of the queue. In an embodiment, placing the result of the instruction in the queue further comprises placing the result in the corresponding data entry identified by a processing element head pointer, wherein the processing element head pointer moves to a subsequent entry after placing the value in the corresponding data entry.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for exchanging data in a system that includes a main processor in communication with an active memory device, the method comprising:
    receiving, at a processing element in the active memory device, an instruction from the main processor;
    receiving, at the processing element, a store request from a thread running on the main processor, the store request specifying a memory address associated with the processing element;
    storing a value provided in the store request in a queue in the processing element, the storing comprising storing the value in a queue entry identified by a processor head pointer, wherein the processor head pointer moves to a subsequent entry after storing the value in the queue entry; and
    performing, by the processing element, the instruction using the value from the queue, wherein storing the value and performing the instruction, in an out-of-order exchange of the data between the processing element and the main processor, are synchronized based on tags assigned to corresponding data, the tags identifying a location of the corresponding data;
    wherein receiving the store request from the thread running on the main processor further comprises receiving a store request from the main processor that bypasses all system cache before it is received by the processing element, and wherein data subject to the store request is exchanged directly between a register in the main processor and the queue in the processing element.

2. The method of claim 1, wherein storing the value comprises storing an 8 byte value or a 16 byte value.

3. The method of claim 1, wherein storing the value, performing the instruction are synchronized based on a predetermined code execution on both the processing element and the main processor.

4. The method of claim 3, wherein the predetermined code execution is determined by a compiler when compiling an application that has code that executes on both the processing element and the main processor.

5. The method of claim 1, wherein receiving the store request from the thread running on the main processor further comprises receiving a push request to push the value to the queue.

6. The method of claim 1, wherein storing the value provided in the store request in the queue further comprises storing the value in a shared queue that is used for both store and load requests.

7. A method for exchanging data in a system that includes a main processor in communication with an active memory device, the method comprising:
    receiving, at a processing element in the active memory device, an instruction from the main processor;
    receiving, at the processing element, a load request from a thread running on the main processor, the load request specifying a memory address associated with the processing element;
    placing tag information relating to the load request in a queue in the processing element, the tag information corresponding to the data requested by the load request and describing the thread running on the main processor that will use the requested data;
    performing, by the processing element, the instruction, wherein performing the instruction, in an out-of-order exchange of the data between the processing element and the main processor, are synchronized based on the tag information, the tag information identifying a location of the corresponding data;
    placing a result of the instruction in the queue corresponding to the tag information; and
    communicating, by the processing element, the result to the main processor in response to the load request, wherein communicating the result comprises bypassing all system cache before it is received by the main processor;
    wherein receiving the load request from the thread running on the main processor further comprises receiving a load request from the main processor that bypasses all system cache before it is received by the processing element, and wherein data subject to the load request is exchanged directly between a register in the main processor and the queue in the processing element.

8. The method of claim 7, wherein placing the result of the instruction in the queue comprises placing the result in a shared queue that is used for both store and load requests.

9. The method of claim 7, wherein placing the result of the instruction in the queue comprises placing an 8 byte result value or a 16 byte result value in the queue.

10. The method of claim 7, wherein placing tag information relating to the load request in the queue, performing the instruction, and placing a result of the instruction in the queue are synchronized based on a predetermined code execution on both the processing element and the main processor.

11. The method of claim 10, wherein the predetermined code execution is determined by a compiler when compiling an application that has code execute on both the processing element and the main processor.

12. The method of claim 11, wherein the predetermined code execution comprises an in order execution wherein the result is placed in the queue without an identifier.

13. The method of claim 7, wherein receiving the load request from the thread running on the main processor further comprises receiving a load request that specifies the memory address associated with the processing element that will provide the result.

14. The method of claim 7, wherein placing the result of the instruction in the queue further comprises placing the result in a register file in the processing element and copying the result from the register file to the queue in the processing element.

15. The method of claim 7, wherein receiving the load request further comprises receiving a pull request to pull the result from the queue.

16. The method of claim 7, wherein placing tag information relating to the load request in the queue further comprises placing the tag information in an information entry in an information portion of the queue, wherein the information entry has a corresponding data entry in a data portion of the queue.

17. The method of claim 16, wherein placing the result of the instruction in the queue further comprises placing the result in the corresponding data entry identified by a processing element head pointer, wherein the processing element head pointer moves to a subsequent entry after placing the value in the corresponding data entry.

* * * * *